United States Patent
An et al.

(10) Patent No.: US 10,326,990 B2
(45) Date of Patent: Jun. 18, 2019

(54) METHOD OF ALTERNATIVE TRANSFORM FOR DATA COMPRESSION

(71) Applicants: Jicheng An, Beijing (CN); Kai Zhang, Beijing (CN)

(72) Inventors: Jicheng An, Beijing (CN); Kai Zhang, Beijing (CN)

(73) Assignee: MEDIATEK SINGAPORE PTE. LTD., Singapre (SG)

( * ) Notice: Subject to any disclaimer, the term of this patent is extended or adjusted under 35 U.S.C. 154(b) by 112 days.

(21) Appl. No.: 15/308,732

(22) PCT Filed: May 11, 2015

(86) PCT No.: PCT/CN2015/078662
§ 371 (c)(1),
(2) Date: Nov. 3, 2016

(87) PCT Pub. No.: WO2015/172694
PCT Pub. Date: Nov. 19, 2015

(65) Prior Publication Data
US 2017/0188029 A1    Jun. 29, 2017

(30) Foreign Application Priority Data

May 14, 2014 (WO) ................ PCT/CN2014/077493

(51) Int. Cl.
*H04N 19/12* (2014.01)
*H04N 19/159* (2014.01)
(Continued)

(52) U.S. Cl.
CPC ........... *H04N 19/12* (2014.11); *H04N 19/157* (2014.11); *H04N 19/159* (2014.11); *H04N 19/176* (2014.11)

(58) Field of Classification Search
CPC .... H04N 19/12; H04N 19/159; H04N 19/176; H04N 19/157
See application file for complete search history.

(56) References Cited

U.S. PATENT DOCUMENTS

| | | | |
|---|---|---|---|
| 6,426,975 B1 | 7/2002 | Nishi et al. | |
| 7,609,766 B2 | 10/2009 | Zeng | |

(Continued)

FOREIGN PATENT DOCUMENTS

| | | |
|---|---|---|
| CN | 1215959 | 5/1999 |
| CN | 1893651 | 1/2007 |

(Continued)

OTHER PUBLICATIONS

International Search Report dated Aug. 3, 2015, issued in application No. PCT/CN2015/078662.

*Primary Examiner* — Howard D Brown, Jr.
(74) *Attorney, Agent, or Firm* — McClure, Qualey & Rodack, LLP

(57) ABSTRACT

A method and apparatus of adaptive image and video coding including an alternative transform other than the discrete cosine transform (DCT) and discrete sine transform (DST) type VII (DST-VII) are disclosed. For at least one block size belonging to the size group, a transform from multiple transforms comprising an alternative transform in addition to DCT and DST-VII is selected and applied to a current block. The alternative transform may correspond to DCT type IV (DCT-IV) or DST type IV (DST-IV).

21 Claims, 3 Drawing Sheets

(51) Int. Cl.
*H04N 19/176* (2014.01)
*H04N 19/157* (2014.01)
*H04N 19/44* (2014.01)

(56) References Cited

U.S. PATENT DOCUMENTS

| | | | |
|---|---|---|---|
| 10,200,719 B2 * | 2/2019 | Zhang | H04N 19/649 |
| 2004/0062212 A1 * | 4/2004 | Mandyam | H04L 27/2607 |
| | | | 370/281 |
| 2006/0176952 A1 * | 8/2006 | Zeng | H04N 19/176 |
| | | | 375/240.2 |
| 2007/0211953 A1 * | 9/2007 | Sasagawa | H04N 19/134 |
| | | | 382/250 |
| 2012/0201300 A1 * | 8/2012 | Kim | H04N 19/105 |
| | | | 375/240.12 |
| 2013/0003828 A1 * | 1/2013 | Cohen | H04N 19/60 |
| | | | 375/240.12 |
| 2013/0114730 A1 * | 5/2013 | Joshi | H04N 19/70 |
| | | | 375/240.18 |
| 2014/0056361 A1 | 2/2014 | Karczewicz | |
| 2016/0219290 A1 * | 7/2016 | Zhao | H04N 19/159 |
| 2016/0309158 A1 * | 10/2016 | Philippe | H04N 19/147 |

FOREIGN PATENT DOCUMENTS

| | | |
|---|---|---|
| CN | 101896966 A | 11/2010 |
| TW | 200741486 A | 11/2007 |
| TW | 201301902 A | 1/2013 |
| WO | WO 2014/031544 | 2/2014 |

\* cited by examiner

METHOD OF ALTERNATIVE TRANSFORM FOR DATA COMPRESSION

CROSS REFERENCE TO RELATED APPLICATIONS

The present invention is a Continuation-In-Part of PCT Patent Application, Ser. No. PCT/CN2014/077493, filed May 14, 2014. The PCT Patent Application is hereby incorporated by reference in its entirety.

TECHNICAL FIELD

The invention relates generally to signal processing. In particular, the present invention relates to transform in video or image coding.

BACKGROUND

The Discrete Cosine Transform type two (DCT-II) is often used in signal processing, especially for lossy data compression, due to its strong "energy compaction" property. For image and video compression, the DCT without explicitly referring to a specific type implies the DCT-II. In the DCT-II representation, most of the signal information tends to be concentrated in a few low-frequency components. For signals based on certain limits of Markov processes, the DCT-II is approaching the Karhunen-Loève transform, which is optimal in decorrelating the underlying signals to obtain a most energy-compact representation.

The N-point DCT of the signal f[n] is defined as in (1).

$$\hat{f}_{DCT}[k] = \lambda_k \frac{2}{\sqrt{N}} \sum_{n=0}^{N-1} f[n] \cos\left[\frac{k\pi}{N}\left(n + \frac{1}{2}\right)\right], \quad (1)$$

$$k = 0, 1, 2, \ldots, N-1, \lambda_k = \begin{cases} 2^{-0.5}, & k = 0 \\ 1, & k \neq 0 \end{cases}$$

In video coding, such as the state-of-the-art international video coding standard HEVC (high efficiency video coding), DCT is also used for its "energy compaction" property. FIG. 1 shows the block diagram of a video encoder utilizing transform coding. First, the original frame subtracts its prediction (Intra- or Inter-prediction) using an adder (110) and results in residual signal. In practice, the residual is often formed on a block by block basis. Second, the transform (120), such as DCT, is applied to the residual signal (i.e., prediction error) to obtain transform coefficients as output. Then the transform coefficients are quantized using a quantizer (130), which may cause signal distortion. Finally the quantized coefficients are entropy coded using an entropy coder (140) into a bitstream. In video coding standards, a picture may be partitioned into different units for different processing. For example, in high efficient video coding (HEVC), a picture is partitioned into coding tree units (CTUs) for applying a set of coding parameters. The CTU may be further partitioned into coding units (CUs). Each CU may be partitioned into one or more prediction units (PUs) to apply prediction (e.g., Inter- or Intra-prediction). The prediction residual for each CU is partitioned into transform units (TUs) to apply transform (e.g., DCT). In video coding, a picture may also be divided into multiple slices for packing compressed data or applying adaptive coding control.

In the current HEVC, the Discrete Sine Transform type seven (DST-VII) is used for 4×4 luma Intra-predicted residual, and DCT is used for all the other cases. It is desirable to improve the performance by incorporating other suited transforms to match characteristics of the underlying residual signals.

SUMMARY

A method and apparatus of adaptive image and video coding including an alternative transform other than the discrete cosine transform (DCT) and discrete sine transform (DST) type VII (DST-VII) are disclosed. For at least one block size belonging to the size group, a transform from multiple transforms comprising an alternative transform in addition to DCT and DST-VII is selected and applied to a current block. The alternative transform may correspond to DCT type IV (DCT-IV) or DST type IV (DST-IV). The first base of the alternative inverse transform is ascending.

A 2N-point DCT can be implemented using an N-point DCT and one of an N-point DCT-IV and N-point DST-IV to reduce the implementation complexity. Furthermore, the DCT-IV or the DST-IV is only applied to the transformed coefficients corresponding to Intra-predicted residuals of the current block to reduce the implementation complexity.

The transform coding with at least one alternative transform can be applied adaptively based on block size. For example, only DCT is allowed for the largest block size and only DST-VII is allowed for the smallest block size (e.g., 4×4). Multiple transforms including at least one alternative transform can be applied to any block size between the largest and the smallest block sizes.

When multiple transforms are used, a flag can be used to signal the transform selected for the current block. The flag can be signaled in TU (transform unit) level, PU (prediction unit) level, CU (coding unit) level, CTU (coding tree unit) level, slice level, picture level, or sequence level.

When the current block corresponds to a transform unit (TU), the transform unit is prohibited from splitting into smaller transform units.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

In HEVC, both the discrete cosine transform (DCT) and the discrete sine transform (DST) can be used to process the residual signals. For the Intra-predicted residual, it is well known that the energy is usually larger at the bottom-right corner and decreases from the bottom-right corner to top-left corner as the prediction distance is shortened. Therefore, some other transforms, such as DST-VII and flipped version of DCT-IV (FDCT-IV) may be more suitable than the DCT. The DST-VII has been used for 4×4 luma Intra-predicted residual in HEVC.

Equation (2) and (3) show the N-point DST-VII and DCT-IV of signal f[n], respectively.

$$\hat{f}_{DST\text{-}VII}[k] = \frac{2}{\sqrt{2N+1}} \sum_{n=0}^{N-1} f[n]\sin\frac{(2k+1)(n+1)\pi}{2N+1}, \quad (2)$$
$$k = 0, 1, \ldots, N-1$$

$$\hat{f}_{DCT\text{-}IV}[k] = \frac{2}{\sqrt{N}} \sum_{n=0}^{N-1} f[n]\cos\left[\frac{\pi}{N}\left(k+\frac{1}{2}\right)\left(n+\frac{1}{2}\right)\right], \quad (3)$$
$$k = 0, 1, \ldots, N-1$$

The Flipped DCT-IV is defined as $\hat{f}_{FDCT\text{-}IV}[k]=\hat{f}_{DCT\text{-}IV}[N-1-k]$, where the index of transform coefficient is flipped. In other words, a FDCT-IV coefficient with index k corresponds to a DCT-IV coefficient with index (N−1−k).

The DCT-IV has additional implementation advantage than the DST-VII. The N-point DCT-IV can be implemented by reusing the process of 2N-point DCT transform, which is already used in HEVC. For example, if 2N-point DCT transform is implemented in electronic circuits, the N-point DCT-IV process can be implemented by reusing the circuits of 2N-point DCT transform. Further analysis of 2N-point DCT transform indicates that some building blocks among different transforms can be shared.

Regrouping the terms f[n] and f[N−1−n] of a DCT in (1) yields the following equations:

$$\hat{f}_{DCT}[2k] = \lambda_k \frac{2}{\sqrt{N}} \sum_{n=0}^{N/2-1} (f[n] + f[N-1-n])\cos\left[\frac{k\pi}{N/2}\left(n+\frac{1}{2}\right)\right], \quad (4)$$

$$\hat{f}_{DCT}[2k+1] = \frac{2}{\sqrt{N}} \sum_{n=0}^{N/2-1} (f[n] - f[N-1-n])\cos\left[\frac{\pi}{N/2}\left(n+\frac{1}{2}\right)\right]. \quad (5)$$

Figure 1:
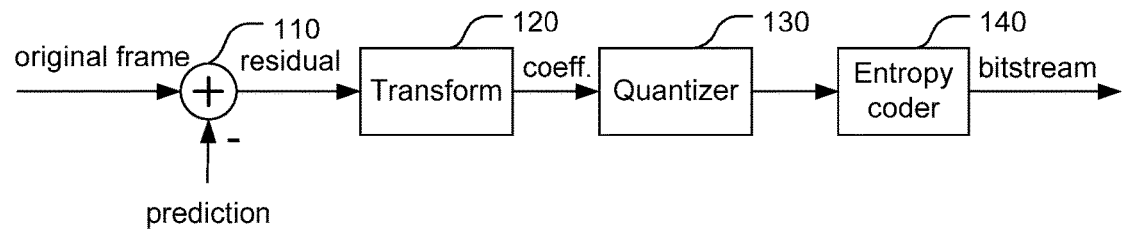
FIG. 1 illustrates an example of system block diagram for transform image/video coding.
Figure 2:
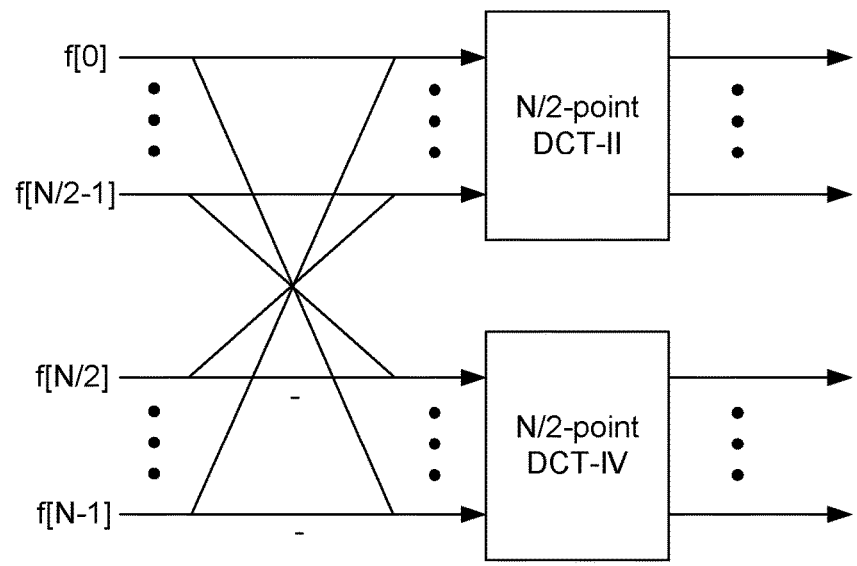
FIG. 2 illustrates an example of implementation of an N-point DCT type II based on an N/2-point DCT type II and an N/2-point DCT type IV.

As shown in equation (4), the even-index coefficients of the DCT are thus equal to the N/2-point DCT of signal f[n]+f[N−1−n]. In other words, the input signal f[n] can be pre-processed to form f[n]+f[N−1−n] as the input to the N/2-point DCT to calculate the even-index coefficients of the N-point DCT. The odd-index coefficients of the DCT are equal to the N/2-point DCT-IV of signal f[n]−f[N−1−n]. In other words, the input signal f[n] can be preprocessed to form f[n]−f[N−1−n] as the input to the N/2-point DCT-IV to calculate the odd-index coefficients of the N-point DCT. FIG. 2 shows the flowchart of N-point DCT implementation based on an N/2-point DCT and an N/2-point DCT-IV. That is also the partial butterfly realization structure in current HEVC. Therefore, the N-point DCT-IV can share the partial logic of 2N-point DCT so that the implementation cost can be reduced.

An example of 4-point DCT transform matrix is shown as follows:

$$\text{4-point } DCT \text{ matrix} \begin{bmatrix} 64 & 64 & 64 & 64 \\ 83 & 36 & -36 & -83 \\ 64 & -64 & -64 & 64 \\ 36 & -83 & 83 & -36 \end{bmatrix}$$

An example of 4-point DCT-IV transform matrix is shown as follows:

$$\text{4-point } DCT\text{-}VI \text{ matrix} \begin{bmatrix} 18 & 50 & 75 & 89 \\ -50 & -89 & -18 & 75 \\ 75 & 18 & -89 & 50 \\ -89 & 75 & -50 & 18 \end{bmatrix}$$

An example of 8-point DCT transform matrix is shown as follows:

$$\text{8-point } DCT \text{ matrix} \begin{bmatrix} 64 & 64 & 64 & 64 & | & 64 & 64 & 64 & 64 \\ 89 & 75 & 50 & 18 & | & -18 & -50 & -75 & -89 \\ 83 & 36 & -36 & -83 & | & -83 & -36 & 36 & 83 \\ 75 & -18 & -89 & -50 & | & 50 & 89 & 18 & -75 \\ \hline 64 & -64 & -64 & 64 & | & 64 & -64 & -64 & 64 \\ 50 & -89 & 18 & 75 & | & -75 & -18 & 89 & -50 \\ 36 & -83 & 83 & -36 & | & -36 & 83 & -83 & 36 \\ 18 & -50 & 75 & -89 & | & 89 & -75 & 50 & -18 \end{bmatrix}$$

The transform matrix for the 8-point DCT is related to the 4-point DCT matrix and the 4-point DCT-IV matrix. The even rows of the 8-point DCT matrix are derived from the 4-point DCT matrix and the odd rows of the 8-point DCT matrix are derived from the 4-point DCT-IV matrix. On the left half of the 8-point DCT matrix, the even rows correspond to the rows of the 4-point DCT matrix. On the right half of the 8-point DCT matrix, the even rows correspond to the rows of the horizontally flipped 4-point DCT matrix. On the left half of the 8-point DCT matrix, the odd rows correspond to the rows of the horizontally flipped 4-point DCT-IV matrix. On the right half of the 8-point DCT matrix, the odd rows correspond to the rows of the signed-reversed 4-point DCT matrix.

To better adapt to the Intra-predicted residual distribution, FDCT-IV is also used for transform besides the DCT according to present invention. In order to balance the complexity and the coding gain, the FDCT-IV is neither applied to the maximum transform unit (TU) nor the minimum transform unit according to one embodiment.

In one embodiment, the maximum transform size (i.e., the maximum block size of the transform unit) allowed is 64×64, and non-square transform sizes such as 32×8 and 16×4 are also allowed. For example, the alternative transform scheme can be applied according to the size of the TU as shown in the Table 1. In this example, a TU with transform sizes 32×32, 16×16, 8×8, 32×8 or 16×4 may use the DCT and the FDCT-IV. A flag can be signaled for the TU having one of these transform sizes to indicate which transform type is used. The flag can be signaled in TU (transform unit) level, PU (prediction unit) level, CU (coding unit) level, CTU (coding tree unit) level, slice level, picture level, or sequence level. When the TU has a minimum block size of 4×4, only DST-VII is allowed to process the block.

TABLE 1

| TU size | Transform |
|---|---|
| 64 × 64 | DCT |
| 32 × 32 | DCT, FDCT-IV |
| 16 × 16 | DCT, FDCT-IV |
| 8 × 8 | DCT, FDCT-IV |
| 32 × 8 | DCT, FDCT-IV |
| 16 × 4 | DCT, FDCT-IV |
| 4 × 4 | DST-VII |

In one embodiment, the alternative transform scheme can be used for the luma component only. For the chroma component, only DCT is used. The first base of the alternative transform is ascending.

In order to reduce the encoder rate distortion optimization (RDO) complexity, the TU splitting is disabled according to one embodiment, i.e., a TU cannot be further split into multiple TUs. Otherwise, the RDO process has to evaluate the rate-distortion performance for each possible TU size, which would substantially increase the computational complexity. Accordingly, the splitting flag for indicating whether a TU is split (e.g., the split_transform_flag used in the conventional coding) can be spared and there is no need to signal the splitting flag.

The DST-IV is similar to DCT-IV. Therefore flipped DST-IV (FDST-IV) can also be used to replace FDCT-IV. Equation (6) illustrates the N-point DST-IV of signal f[n]:

$$\hat{f}_{DST\text{-}IV}[k] = \frac{2}{\sqrt{N}} \sum_{n=0}^{N-1} f[n] \sin\left[\frac{\pi}{N}\left(k+\frac{1}{2}\right)\left(n+\frac{1}{2}\right)\right], \quad (6)$$

$$k = 0, 1, \ldots, N-1$$

It is known in the field that a 2N-point DCT transform can also be implemented using an N-point DST-IV and an N-point DCT.

The foregoing embodiments may correspond to a video encoder, which selects and applies a transform to an input signal (e.g., the residual signal or the original signal) to generate the transformed coefficients, in which the transform to be selected is not restricted to DCT transform or DST-VII transform. For example, if the corresponding block size of the input signal belongs to a specific subgroup of a size group, the transform candidates for the input signal comprise one or more alternative transforms, the DCT transform and the DST-VII transform. Otherwise, the transform candidates for the input signal only comprise the DCT transform and the DST type VII transform.

Although the foregoing embodiments are about the transform process utilized by a video encoder, the inverse transform process utilized by a video decoder is also not restricted to inverse DCT transform or inverse DST-VII transform. For example, when the block size corresponding to the transformed coefficients belongs to a subgroup of the size group (e.g., the subgroup may consist all block sizes except for a maximum block size and a minimum block size), the alternative inverse transform such as inverse DCT-IV or inverse DST-IV can be an inverse transform candidate as well as the inverse DCT transform and the inverse DST-VII transform. Since the inverse transform and the transform are the corresponding concept, the details are omitted here.

Figure 3:
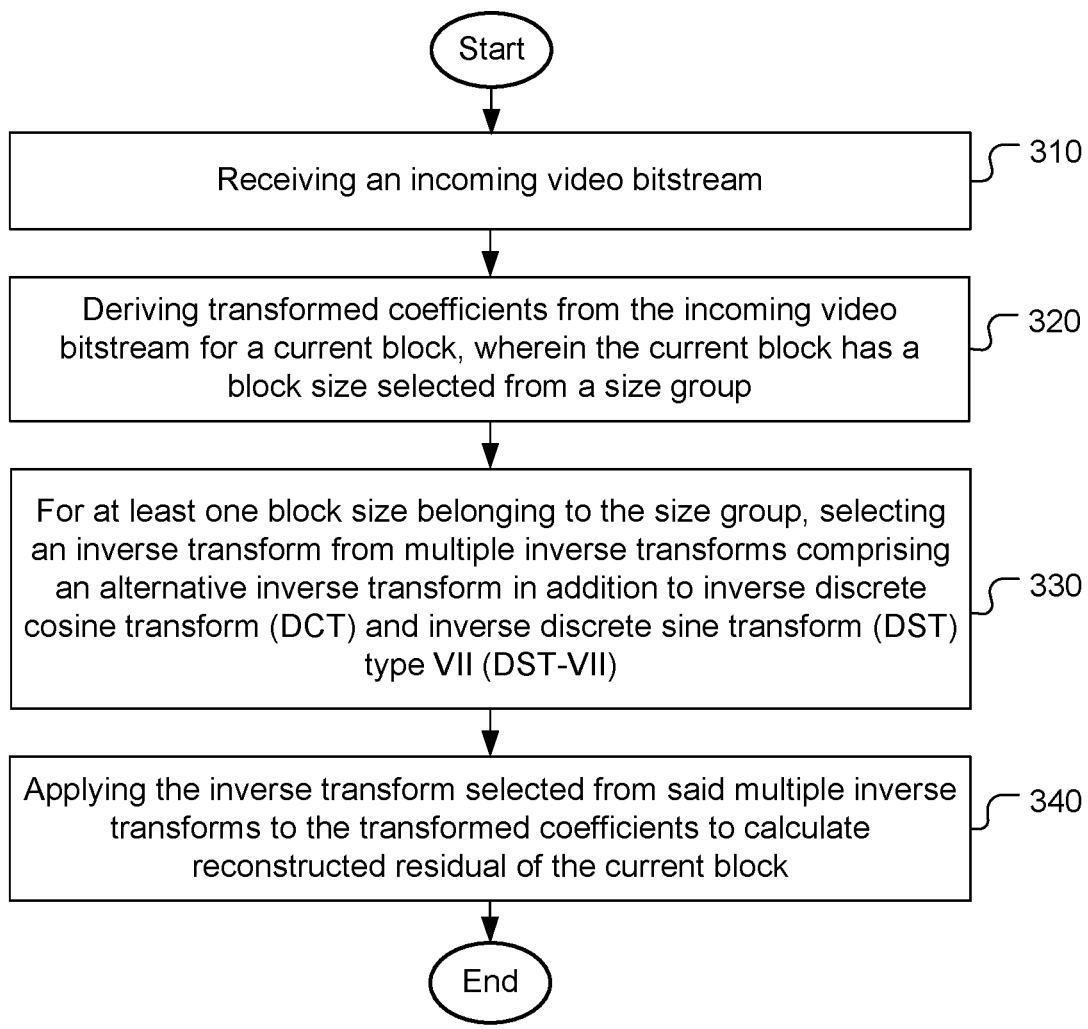
FIG. 3 illustrates an exemplary flowchart of an image/video transform coding for an image/video decoder incorporating multiple inverse transforms including an alternative inverse transform in addition to inverse DCT and inverse DST type VII according to an embodiment of the present invention.

FIG. 3 illustrates an exemplary flowchart of an image/video transform coding for an image/video decoder incorporating multiple inverse transforms including an alternative inverse transform in addition to inverse DCT and inverse DST type VII according to an embodiment of the present invention. An incoming video bitstream is received in step 310. The incoming video bitstream may be retrieved from storage such as a computer memory, buffer (RAM or DRAM) or other media. The incoming video bitstream may also be received from a processor such as a controller, a central processing unit, a digital signal processor or electronic circuits that produce the input data. Transformed coefficients are derived from the incoming video bitstream for a current block in step 320, where the current block has a block size selected from a size group. For at least one block size belonging to the size group, an inverse transform is selected from multiple inverse transforms comprising an alternative inverse transform in addition to inverse discrete cosine transform (DCT) and inverse discrete sine transform (DST) type VII (DST-VII) in step 330. The inverse transform selected from said multiple inverse transforms is applied to the transformed coefficients to calculate reconstructed residual of the current block in step 340.

Figure 4:
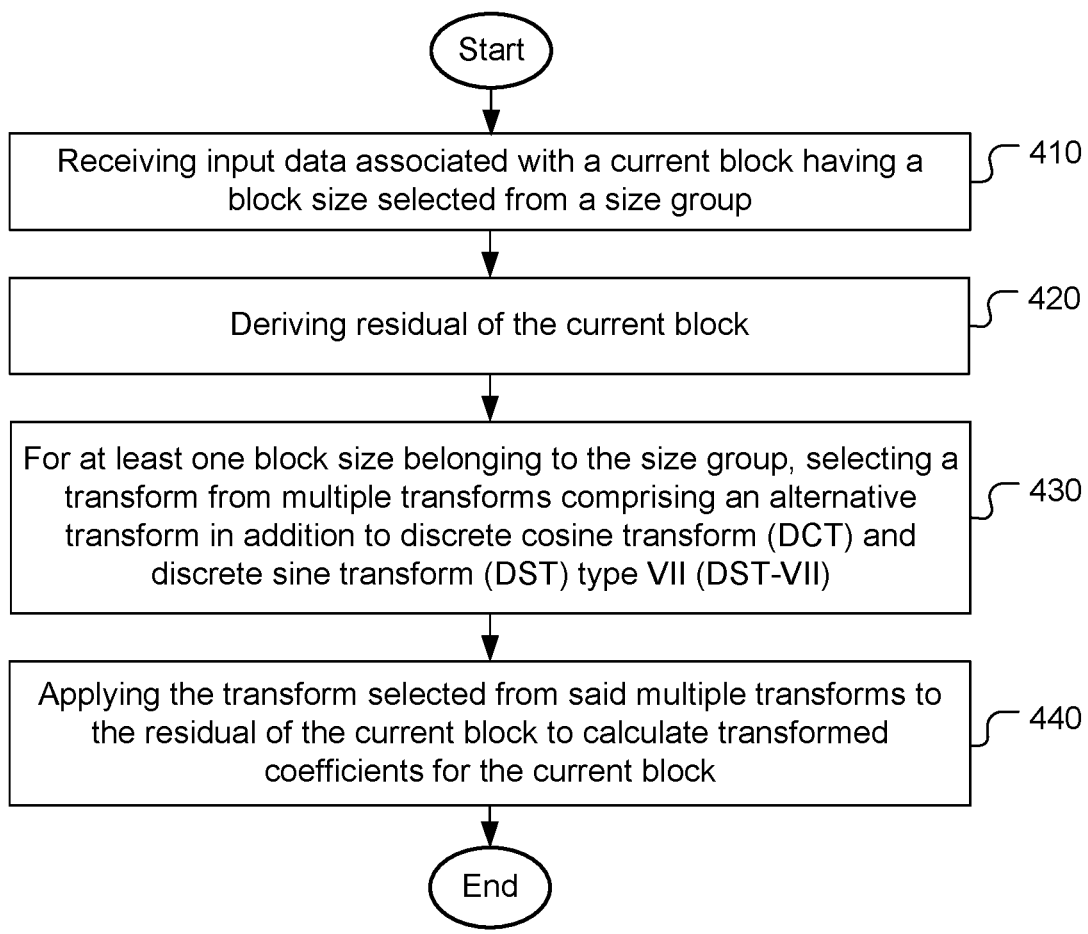
FIG. 4 illustrates an exemplary flowchart of an image/video transform coding for an image/video encoder incorporating multiple transforms including an alternative transform in addition to DCT and DST type VII according to an embodiment of the present invention.

FIG. 4 illustrates an exemplary flowchart of an image/video transform coding for an image/video encoder incorporating multiple transforms including an alternative transform in addition to DCT and DST type VII according to an embodiment of the present invention. Input data associated with a current block having a block size selected from a size group is received in step 410. The input data may be retrieved from storage such as a computer memory, buffer (RAM or DRAM) or other media. The input data may also be received from a processor such as a controller, a central processing unit, a digital signal processor or electronic circuits that produce the input data. Residual of the current block is derived in step 420. For at least one block size belonging to the size group, a transform is selected from multiple transforms comprising an alternative transform in addition to discrete cosine transform (DCT) and discrete sine transform (DST) type VII (DST-VII) in step 430. The transform selected from said multiple transforms is applied to the residual of the current block to calculate transformed coefficients for the current block in step 440.

The flowcharts shown above are intended to illustrate an example of image/video coding using transform coding including an alternative transform. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for video decoding, the method comprising:
receiving an incoming video bitstream;
deriving transformed coefficients from the incoming video bitstream for a current block, wherein the current block has a block size selected from a size group;
for at least one block size belonging to the size group, selecting an inverse transform from multiple inverse transforms comprising an alternative inverse transform in addition to inverse discrete cosine transform (DCT) and inverse discrete sine transform (DST) type VII (DST-VII); and
applying the inverse transform selected from said multiple inverse transforms to the transformed coefficients to calculate reconstructed residual of the current block, wherein if the block size corresponds to a maximum block size, only the inverse DCT is selected to apply to the transformed coefficients to calculate the reconstructed residual of the current block.

2. The method of claim 1, wherein the alternative inverse transform corresponds to inverse DCT type IV (DCT-IV) or inverse DST type IV (DST-IV).

3. The method of claim 2, wherein the inverse DCT having a maximum transform size of 2N points is implemented using a first inverse DCT having a transform size of N points and one of the inverse DCT-IV and inverse DST-IV having the transform size of N points, wherein N is a positive integer.

4. The method of claim 2, wherein the inverse DCT-IV or the inverse DST-IV is only applied to the transformed coefficients corresponding to Intra-predicted residuals of the current block.

5. The method of claim 1, wherein when the block size belongs to a first partial group of the size group, the current block uses the inverse transform selected from said multiple inverse transforms.

6. The method of claim 5, wherein the first partial group of the size group consists of all block sizes except for a maximum block size and a minimum block size.

7. The method of claim 6, wherein if the block size corresponds to the maximum block size, only the inverse DCT is selected to apply to the transformed coefficients and if the block size corresponds to the minimum block size, only the inverse DST-VII is selected to apply to the transformed coefficients.

8. The method of claim 5, wherein said multiple inverse transforms consist of the inverse DCT and inverse DCT type IV (DCT-IV) or consist of the inverse DCT and inverse DST type IV (DST-IV).

9. The method of claim 5, wherein a flag is used to select the inverse transform from said multiple inverse transforms.

10. The method of claim 9, wherein the flag is signaled in TU (transform unit) level, PU (prediction unit) level, CU (coding unit) level, CTU (coding tree unit) level, slice level, picture level, or sequence level.

11. The method of claim 1, wherein if the block size corresponds to a minimum block size of 4×4, only the inverse DST-VII is selected to apply to the transformed coefficients to calculate the reconstructed residual of the current block.

12. The method of claim 1, wherein when the current block corresponds to a transform unit, the transform unit is prohibited from splitting into smaller transform units.

13. The method of claim 1, wherein a first base of the alternative inverse transform is ascending.

14. A method for video encoding, the method comprising:
receiving input data associated with a current block having a block size selected from a size group;
deriving a residual of the current block;
for at least one block size belonging to the size group, selecting a transform from multiple transforms comprising an alternative transform in addition to discrete cosine transform (DCT) and discrete sine transform (DST) type VII (DST-VII); and
applying the transform selected from said multiple transforms to the residual of the current block to calculate transformed coefficients for the current block, wherein if the block size corresponds to a maximum block size, only the DCT is applied to the residual to calculate the transformed coefficients of the current block.

15. The method of claim 14, wherein the alternative transform corresponds to DCT type IV (DCT-IV) or DST type IV (DST-IV).

16. The method of claim 15, wherein the DCT having a maximum transform size of 2N points is implemented using a first DCT having a transform size of N points and one of the DCT-IV and DST-IV having the transform size of N points, wherein N is a positive integer.

17. The method of claim 15, wherein the DCT-IV or the DST-IV is only applied to the transformed coefficients corresponding to Intra-predicted residuals of the current block.

18. The method of claim 14, wherein when the block size belongs to a first partial group of the size group, the current block uses the transform selected from said multiple transforms.

19. The method of claim 14, wherein if the block size corresponds to a minimum block size of 4×4, only the DST-VII is selected to apply to the residual to calculate the transformed coefficients of the current block.

20. An apparatus, comprising:
a processor configured to execute machine-readable code that causes the processor to:
receive an incoming video bitstream;
derive transformed coefficients from the incoming video bitstream for a current block, wherein the current block has a block size selected from a size group;

for at least one block size belonging to the size group, select an inverse transform from multiple inverse transforms comprising an alternative inverse transform in addition to inverse discrete cosine transform (DCT) and inverse discrete sine transform (DST) type VII (DST-VII); and apply the inverse transform selected from said multiple inverse transforms to the transformed coefficients to calculate reconstructed residual of the current block, wherein if the block size corresponds to a maximum block size, only the inverse DCT is selected to apply to the transformed coefficients to calculate the reconstructed residual of the current block.

21. An apparatus, comprising:

a processor configured to execute machine-readable code that causes the processor to:

receive input data associated with a current block having a block size selected from a size group;

derive a residual of the current block;

for at least one block size belonging to the size group, select a transform from multiple transforms comprising an alternative transform in addition to discrete cosine transform (DCT) and discrete sine transform (DST) type VII (DST-VII); and apply the transform selected from said multiple transforms to the residual of the current block to calculate transformed coefficients for the current block, wherein if the block size corresponds to a maximum block size, only the DCT is applied to the residual to calculate the transformed coefficients of the current block.

* * * * *